US012741514B2

(12) United States Patent
Harmon et al.

(10) Patent No.: US 12,741,514 B2
(45) Date of Patent: Sep. 22, 2026

(54) VEHICLE CARGO SPACE ACCESS PROVIDING METHOD

(71) Applicant: Ford Global Technologies, LLC, Dearborn, MI (US)

(72) Inventors: Michael John Harmon, Northville, MI (US); Frank Thomas Brown, Santa Fe, NM (US); Kendra Marie Rabineau, Berkley, MI (US); Stuart Jamieson, Ann Arbor, MI (US); Max Tran, Pascoe Vale (AU); Leigh H. Cosentino, Woodend (AU); Andrew Beard, Glenaroua (AU); Mark Johnson, Warranwood (AU); Nick David Eterovic, Brunswick West (AU)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 18/644,804

(22) Filed: Apr. 24, 2024

(65) Prior Publication Data

US 2025/0332892 A1 Oct. 30, 2025

(51) Int. Cl.

| | |
|---|---|
| ***B60J 5/00*** | (2006.01) |
| ***B60J 5/02*** | (2006.01) |
| ***B60R 11/02*** | (2006.01) |
| *B60R 11/00* | (2006.01) |

(52) U.S. Cl.
CPC ............. *B60J 5/02* (2013.01); *B60R 11/0235* (2013.01); *B60R 2011/0036* (2013.01)

(58) Field of Classification Search
CPC . B60J 5/02; B60R 11/0235; B60R 2011/0036
USPC ........................................................ 296/37.6
See application file for complete search history.

(56) References Cited

U.S. PATENT DOCUMENTS

| | | | | |
|---|---|---|---|---|
| 10,716,192 | B1 | 7/2020 | Tsibulevskiy | |
| 11,198,519 | B1 | 12/2021 | Seeley | |
| 11,897,456 | B2 * | 2/2024 | Woolliscroft | G08G 1/168 |
| 11,912,237 | B2 | 2/2024 | Harmon et al. | |
| 11,960,198 | B2 | 4/2024 | Harmon et al. | |
| 2019/0049977 | A1 | 2/2019 | Dean et al. | |
| 2022/0297679 | A1 | 9/2022 | Woolliscroft et al. | |
| 2023/0046080 | A1 | 2/2023 | Harmon | |
| 2023/0227003 | A1 | 7/2023 | Herman et al. | |
| 2023/0388803 | A1 | 11/2023 | Bayer et al. | |

(Continued)

FOREIGN PATENT DOCUMENTS

| | | | |
|---|---|---|---|
| CN | 107077810 | A | 8/2017 |
| JP | 2022115856 | A | 8/2022 |

(Continued)

*Primary Examiner* — Steven O Douglas
(74) *Attorney, Agent, or Firm* — Vichit Chea; Carlson, Gaskey & Olds, P.C.

(57) ABSTRACT

A vehicle cargo space access providing method includes, in response to a request to access a cargo space of a vehicle that is in a first parked position, confirming that a movement of the vehicle from the first parked position to a second parked position is unobstructed. The method further includes, continuing the confirming, and moving the vehicle automatically from the first parked position to the second parked position. The cargo space is more accessible to a user when the vehicle is in the second parked position than when the vehicle is in the first parked position.

20 Claims, 8 Drawing Sheets

(56) References Cited

U.S. PATENT DOCUMENTS

| | | | |
|---|---|---|---|
| 2023/0391267 | A1 | 12/2023 | Harmon et al. |
| 2023/0391269 | A1 | 12/2023 | Harmon et al. |
| 2023/0393455 | A1 | 12/2023 | Harmon et al. |
| 2024/0059223 | A1 | 2/2024 | Harmon et al. |

FOREIGN PATENT DOCUMENTS

| | | | |
|---|---|---|---|
| WO | 2018027242 | A1 | 2/2018 |
| WO | 2020012241 | A1 | 1/2020 |
| WO | 2020046906 | A1 | 3/2020 |

* cited by examiner

VEHICLE CARGO SPACE ACCESS PROVIDING METHOD

TECHNICAL FIELD

This disclosure relates generally to accessing a cargo space of a vehicle.

BACKGROUND

Vehicles can include various cargo spaces, such as a trunk. With the onset of electrified vehicles, many existing components, such as internal combustion engines, may become unnecessary. The space made available by the omission of these components makes room for incorporating other types of cargo spaces, such a front trunk, which is a cargo space located near the front of the vehicle, and which is commonly referred to using the portmanteau "frunk."

SUMMARY

In some aspects, the techniques described herein relate to a vehicle cargo space access providing method, including: in response to a request to access a cargo space of a vehicle that is in a first parked position, confirming that a movement of the vehicle from the first parked position to a second parked position is unobstructed; and while continuing the confirming, moving the vehicle automatically from the first parked position to the second parked position, the cargo space more accessible to a user when the vehicle is in the second parked position than when the vehicle is in the first parked position.

In some aspects, the techniques described herein relate to a vehicle cargo space access providing method, wherein the request including receiving a signal initiated by the user.

In some aspects, the techniques described herein relate to a vehicle cargo space access providing method, wherein the request includes detecting that the user is approaching the vehicle using a sensor suite of the vehicle.

In some aspects, the techniques described herein relate to a vehicle cargo space access providing method, wherein the request includes detecting, using a sensor suite of the vehicle, that the user is approaching the vehicle while transporting an item.

In some aspects, the techniques described herein relate to a vehicle cargo space access providing method, further including confirming that the movement is unobstructed using a sensor suite of the vehicle.

In some aspects, the techniques described herein relate to a vehicle cargo space access providing method, wherein the moving includes reversing the vehicle from the first parked position to the second parked position.

In some aspects, the techniques described herein relate to a vehicle cargo space access providing method, wherein the cargo space of the vehicle is a frunk.

In some aspects, the techniques described herein relate to a vehicle cargo space access providing method, wherein the frunk is closer to an obstacle when the vehicle is in a first parked position than when the vehicle is in a second parked position.

In some aspects, the techniques described herein relate to a vehicle cargo space access providing method, wherein the vehicle is unoccupied during the confirming and the moving.

In some aspects, the techniques described herein relate to a vehicle cargo space access providing method, wherein the vehicle is a truck.

In some aspects, the techniques described herein relate to a vehicle cargo space access providing method, wherein the vehicle is an electrified vehicle.

In some aspects, the techniques described herein relate to a vehicle cargo space access providing method, further including opening a closure assembly automatically to provide access to the cargo space.

In some aspects, the techniques described herein relate to a vehicle cargo space access providing method, wherein the closure assembly is a split gate frunk hood assembly having an upper closure that pivots upward during the opening, and a lower closure that pivots downward during the opening.

In some aspects, the techniques described herein relate to a vehicle cargo space access providing method, wherein the upper closure includes a upper work surface that is horizontally aligned when the upper closure is in a closed position, and the lower closure includes a lower closure work surface that is horizontally aligned when the lower closure is in an open position.

In some aspects, the techniques described herein relate to a vehicle cargo space access providing method, wherein the lower closure is movable to the open position when the upper closure is in a closed position.

In some aspects, the techniques described herein relate to a vehicle cargo space access providing method, wherein the upper work surface is configured as a swappable work surface, the lower work surface is configured as a swappable work surface, or both.

In some aspects, the techniques described herein relate to a vehicle cargo space access providing method, wherein at least some of the opening occurs during the moving.

In some aspects, the techniques described herein relate to a vehicle cargo space access providing method, further including, additionally confirming that a movement of the vehicle from the second parked position back to the first parked position is unobstructed, and, while continuing the confirming, moving the vehicle automatically from the second parked position to the first parked position.

In some aspects, the techniques described herein relate to a vehicle cargo space access providing method, wherein the cargo space is a frunk containing a case configured to hold a television.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary methods of providing access to a cargo space of a vehicle. The methods involve automatically moving the vehicle to facilitate access to the cargo space.

Figure 1:
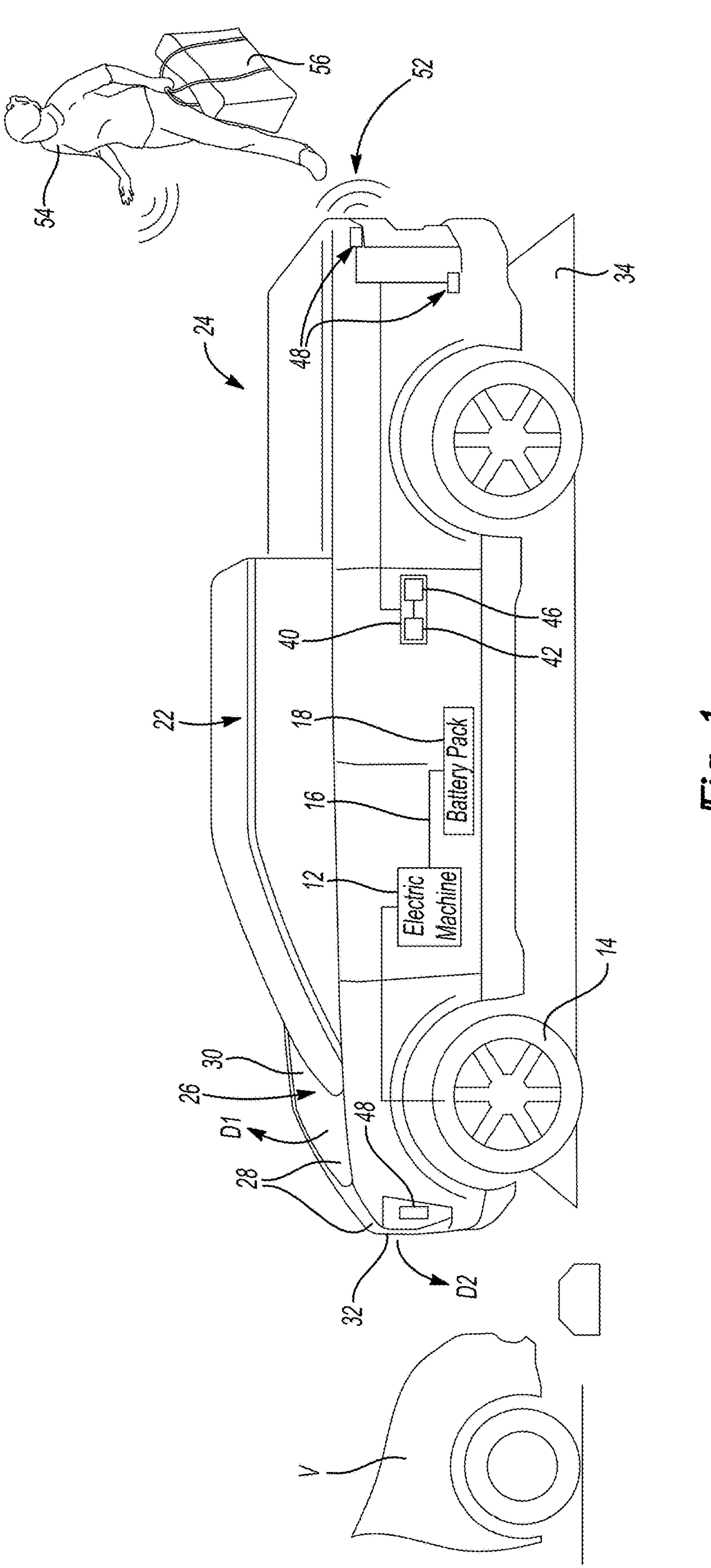
FIG. 1 illustrates a side view of an example electrified vehicle.
Figure 2:
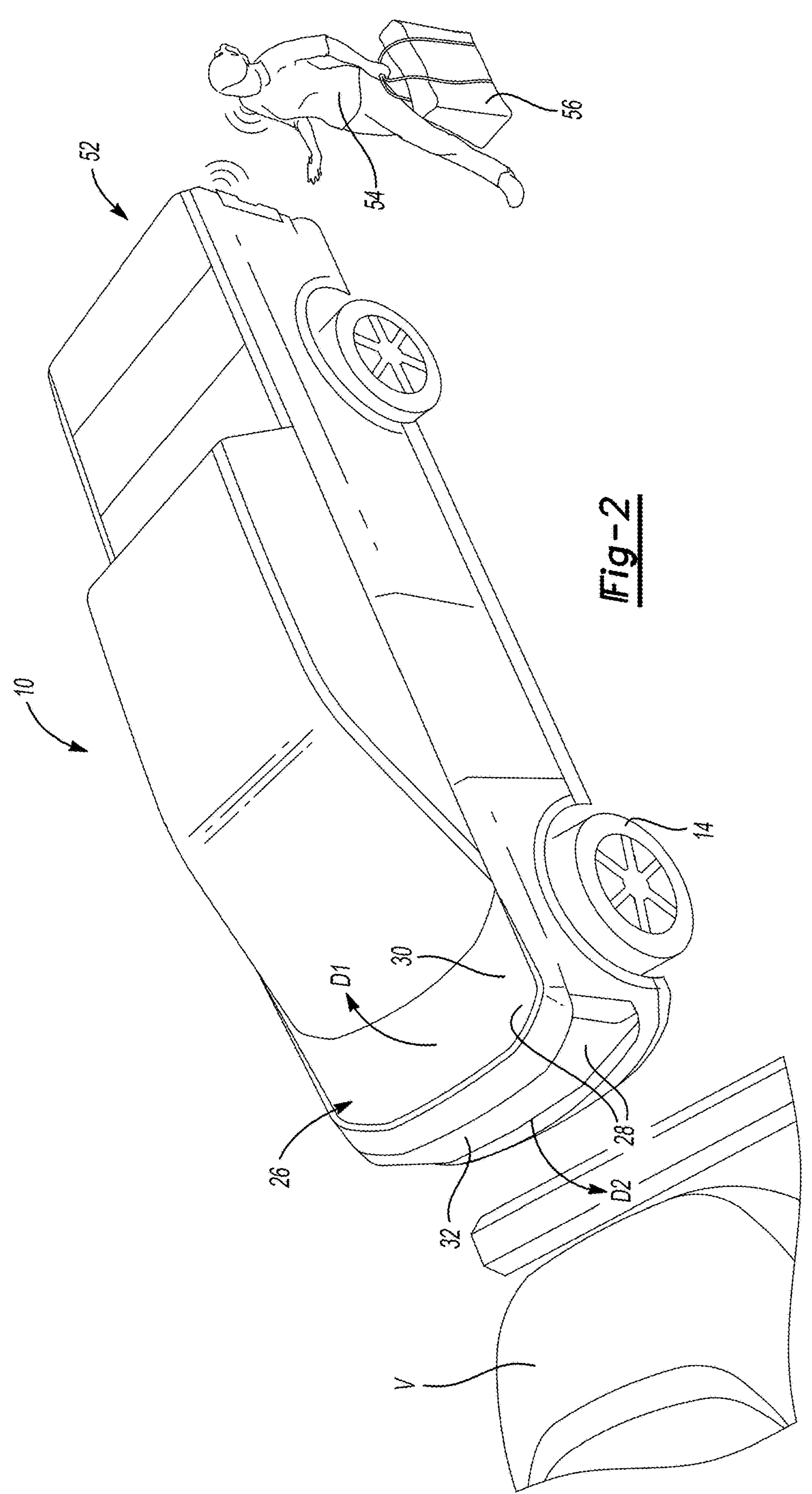
FIG. 2 illustrates a top, perspective view of the example electrified vehicle of FIG. 1.

FIGS. 1 and 2 show a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles, such as conventional vehicles propelled by an internal combustion engines.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

The vehicle 10 includes a passenger cabin 22, a truck bed 24 located to the rear of the passenger cabin 22, and a frunk 26 located to the front of the passenger cabin 22. The truck bed 24 may establish a first cargo space of the vehicle 10, and the frunk 26 may establish a second cargo space of the vehicle 10. The frunk 26 may be referred to using the portmanteau "frunk" or more generally as a front cargo space. The frunk 26 may provide an additional cargo space not traditionally available in most conventional internal combustion powered vehicles. This disclosure includes various features that increase the usefulness and usability of cargo spaced of the vehicle 10 such as the frunk 26.

The frunk 26 is selectively covered by a closure assembly 28. In this example, the closure assembly 28 is a split gate frunk hood assembly having an upper closure 30 that pivots upward in a direction D1 when opening, and a lower closure 32 that pivots downward in a direction D2 when opening. The upper closure 30 and the lower closure 32 can be opened and closed independently from one another in this example. A user can set preferences for how the closure assembly 28 opens and closes. For example, the user could program just the upper closure 30 to open, just the lower closure 32 to open, or both to open together.

The vehicle 10 is shown in a first parked position in FIGS. 1 and 2. In the example first parked position, the vehicle 10 is in a parking spot 34 of a parking lot. Another vehicle V is parked in another parking spot of the parking lot. The other vehicle V is parked near the frunk 26. The other vehicle V can inhibit a user accessing the frunk 26 to, for example, load or unload an item.

The example vehicle 10 can move from the first parked position to make the frunk 26 more accessible to the user. In an example, the vehicle 10 includes a controller module 40 having a processor 42 and non-transitory memory 46 for executing various control strategies and modes. The processor 42 can be a custom made or commercially available processor, a central processing unit (CPU), or generally any device for executing software instructions. The memory 46 can include any one or combination of volatile memory elements and/or nonvolatile memory elements.

The processor 42 may be operably coupled to the memory 46 and may be configured to execute one or more programs stored in the memory 46 of the controller module 40 based on the various inputs received from other devices, such as a sensor suite 48 of the vehicle 10 or a user device 50 carried by a user of the vehicle 10. The sensor suite 48 can include autonomous sensors such as cameras, lidar, radar, and ultrasonic.

One example program stored in the memory 46 is a vehicle cargo space access providing method. The processor 42 can execute this method to move the vehicle 10 automatically from the first parked position to enhance access to the frunk 26.

Figure 3:
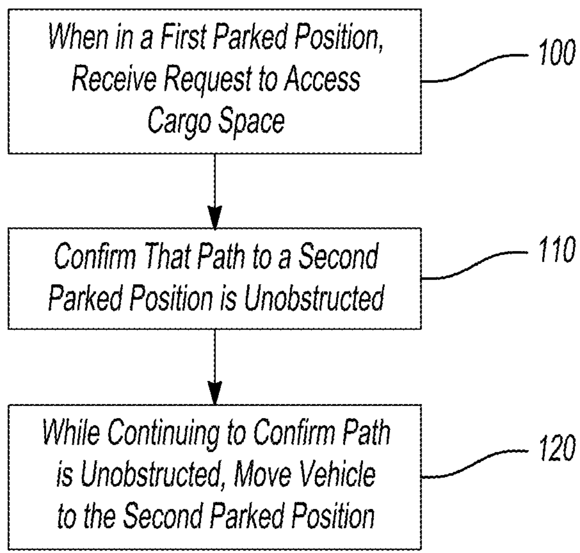
FIG. 3 illustrates a flow of an example vehicle cargo space access providing method.

With reference to FIG. 3, the method begins at a step 100 where the vehicle 10 receives a request to access the frunk 26. The request can be based on a user is approaching the vehicle 10 and moving within a certain distance of the vehicle 10, which may be detected by the vehicle 10 based on the sensor suite 48 detecting that a user device, such as a keyfob or smartphone typically carried by the user, has moved closer to the vehicle 10.

The vehicle 10 can instead or additionally recognize that the user is approaching the vehicle 10 using cameras of the sensor suite 48 or other sensors. In some examples, the user must be move within a certain distance of the vehicle 10 while transporting a package or another item in order for the vehicle 10 to interpret the user as needing access to the frunk 26. That is, if the user is approaching the vehicle 10 without transporting an item, the method will not interpret the user as requesting access to the frunk 26, but if the user is transporting an item, the method will interpret the user as requesting access to the frunk 26. The sensor suite 48, particularly cameras of the vehicle 10, can be relied on to determine whether or not the user is transporting an item.

In other examples, the request can be received from the user based on an user action. For example, the vehicle 10 could receive the request to access the frunk 26 as a signal that is sent from the user's smartphone to the vehicle 10 based on a user's interaction with the smartphone. The user could, for example, tap a "request front trunk access" icon on their smartphone to initiate transmission of a signal to the vehicle 10.

After the vehicle 10 has received the request to access the frunk 26 at the step 100, the method moves to a step 110 where the method confirming that a path for the vehicle to move from the first parked position of FIGS. 1 and 2, to a second parked position is unobstructed. The frunk 26 is more accessible to the user when in the second parked position than when the vehicle 10 is in the first parked position. The second parked position could be a position where the vehicle 10 is spaced further from an obstacle, such as the vehicle V, for example.

The sensor suite 48 can be relied on to ensure that the movement to the second parked position is unobstructed. The sensor suite 48 can include cameras and sensors that make sure there are no obstacles in the path to the second parked position, and that there are no obstacles that will enter the path to the second parked position if the vehicle 10 were to move along the path. The analysis would include making sure that the user is clear of the path to the second parked position. Simply put, the analysis confirms that the path to the second parked position is unobstructed. If there is an obstruction, the vehicle 10 will not be moved.

The method then progresses to a step 120 where, while continuing to confirm that the path to the second parked position is unobstructed, moves the vehicle 10 automatically from the first parked position of FIGS. 1 and 2 to the second parked position where the frunk 26 is more accessible to the user. The method could, prior to the step 120, send a message to the user requesting authorization to move the vehicle 10 to the second parked position.

Movement of the vehicle 10 to the second parked position can be considered an autonomous movement of the vehicle 10. The vehicle 10 is unoccupied when moving to the second parked position in this example.

In some examples, the vehicle 10 can broadcast alerts, such as flashing lights, emitting sounds, or both, while the vehicle 10 is moving to the second parked position. In some examples, the closure assembly 28 can open as the vehicle 10 is moving to the second parked position. Opening the closure assembly 28 could include opening the upper closure 30, the lower closure 32, or both.

After reaching the second parked position, the vehicle 10 is locked in a parking gear, and the user can then load an item, remove an item, or otherwise access the frunk 26. After confirming that access is no longer required, the vehicle 10 can confirm that the path back to the first parked position is unobstructed and then move the vehicle 10 autonomously back to the first parked position while continuing to confirm that the path back to the first parked position remains unobstructed.

Stages of the example vehicle cargo space access providing method are now described in connection with FIGS. 4-6 with continuing reference to FIGS. 1-3. FIGS. 1 and 2 show the vehicle 10 in the first parked position and receiving a request 52 to access the frunk 26. The request 52 is the sensor suite 48 receiving a signal generated in response to a user 54 transporting an item 56 moving within a certain distance of the vehicle 10 in the first parked position.

Figure 4:
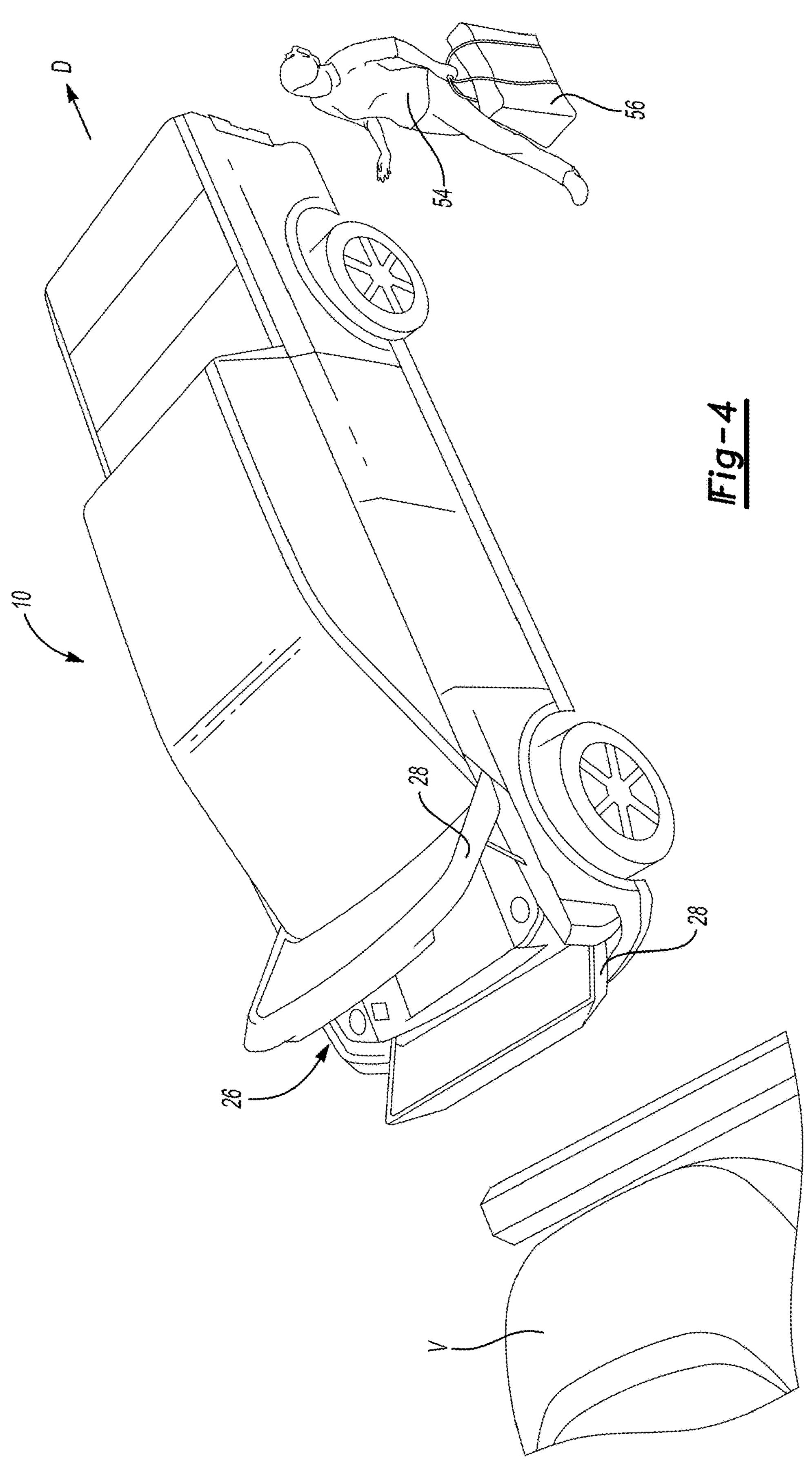
FIG. 4 illustrates the electrified vehicle of FIGS. 1 and 2 moving from the first parked position of FIGS. 1 and 2 to a second parked position.

In FIG. 4, the vehicle 10 has confirmed that a path to a second parked position is unobstructed and, while continuing to confirm that the path is unobstructed, started to move in a direction D toward a second parked position. The movement in the direction D is an autonomous movement of the vehicle 10 in reverse, which moves the vehicle 10 away from the vehicle V. Notably, in this example, the closure assembly 28 begins to open as the vehicle 10 is moved in the direction D.

Figure 5:
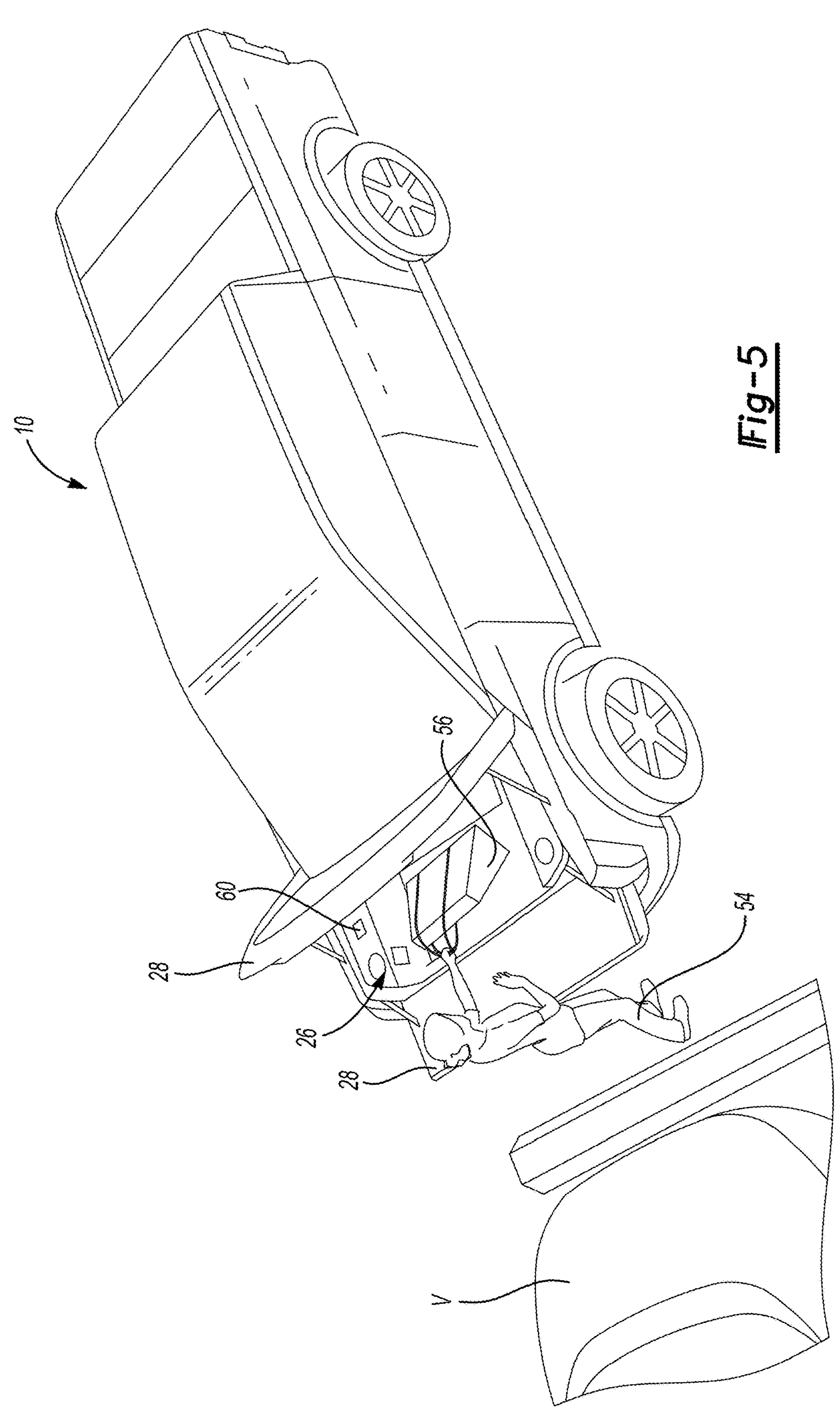
FIG. 5 illustrates the electrified vehicle in the second parked position.

FIG. 5 shows the vehicle 10 in the second parked position with the closure assembly 28 fully opened. The user 54 is accessing the frunk 26 by positioning the item 56 in the front trunk. The frunk 26 is more accessible to the user 54 when the vehicle 10 is in the second parked position at least because the vehicle 10 is further from the vehicle 10 in the second parked position than in the first parked position of FIGS. 1 and 2.

After loading the item 56 and when accessing the frunk 26 is no longer required, the user 54 can actuate a button 60 to initiate the closure assembly 28 to move back to the closed position. The user 54 can then move away from the vehicle 10.

Figure 6:
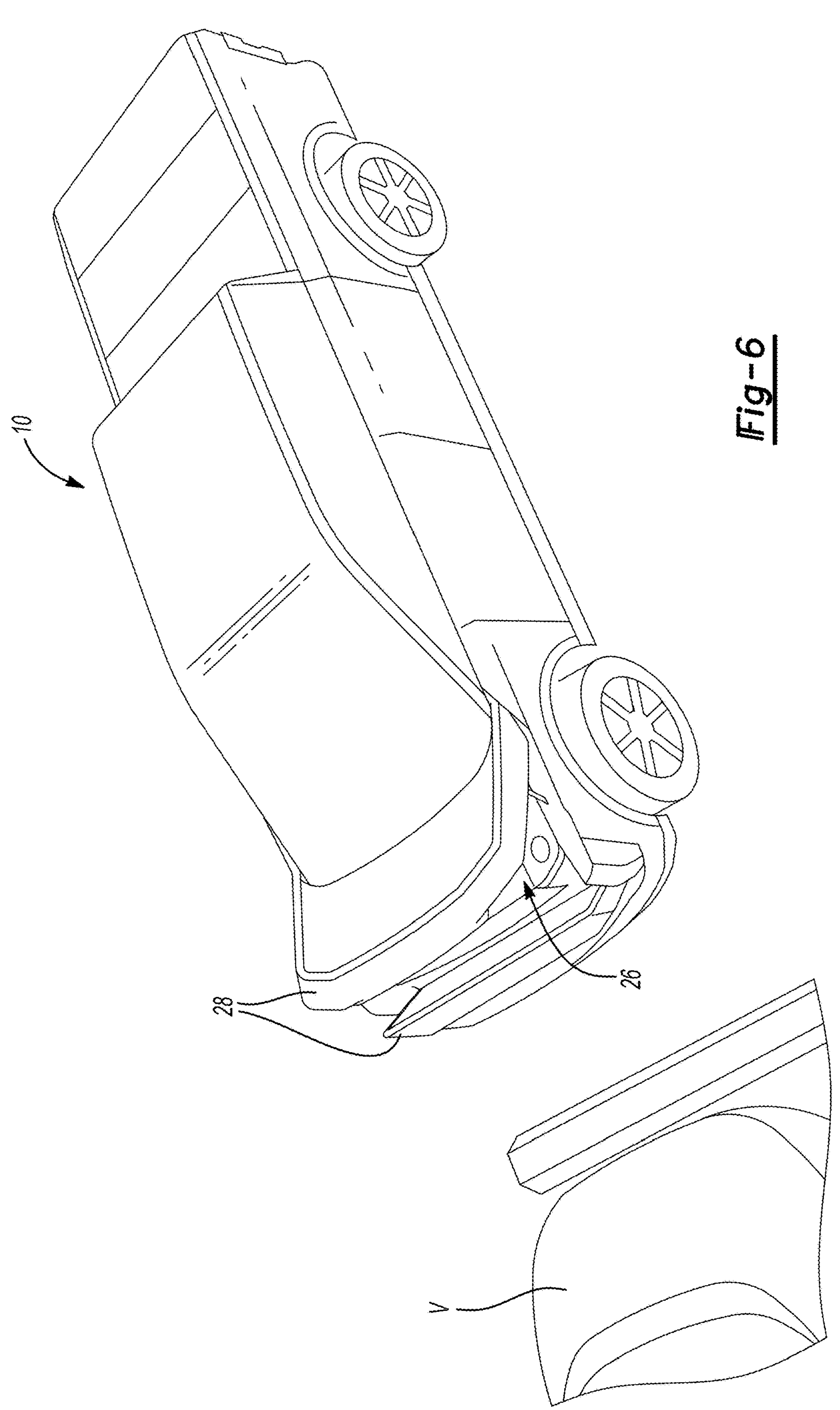
FIG. 6 illustrates the electrified vehicle of FIG. 5 moving from the second parked position back to the first parked position.

FIG. 6 shows the vehicle 10 autonomously moving from the second parked position back to the first parked position after confirmed that the path back to the first parked position is unobstructed and while continuing to confirm that the path back the first parked position is unobstructed. The movement back to the second parked position is initiated in response to the user 54 actuating the button 60 and after confirming that the path back to the first parked position is unobstructed. In this example, the closure assembly 28 moves back to the closed position as the vehicle 10 moves back to the first parked position.

After completing the movement back to the first parked position, the vehicle 10 is positioned as shown in FIGS. 1 and 2, but with the item 56 loaded in the frunk 26.

In some examples, the user 54 can adjust settings associated with the vehicle cargo space accessing using, for example, a smart phone. Adjustable settings can include opening just the upper closure 30, just the lower closure 32, or opening both. Other settings adjustable by the user can include how far the vehicle 10 moves when moving to the second parked position. The settings could be adjusted using voice commands, for example.

The example method is described in connection with providing access to the frunk 26. In other examples, the method could be used to provide the user 54 with access to another cargo space of the vehicle 10. For example, if the vehicle 10 is backed into the parking spot 34, the vehicle 10 could autonomously move forward to facilitate access to the truck bed 24.

Figure 7:
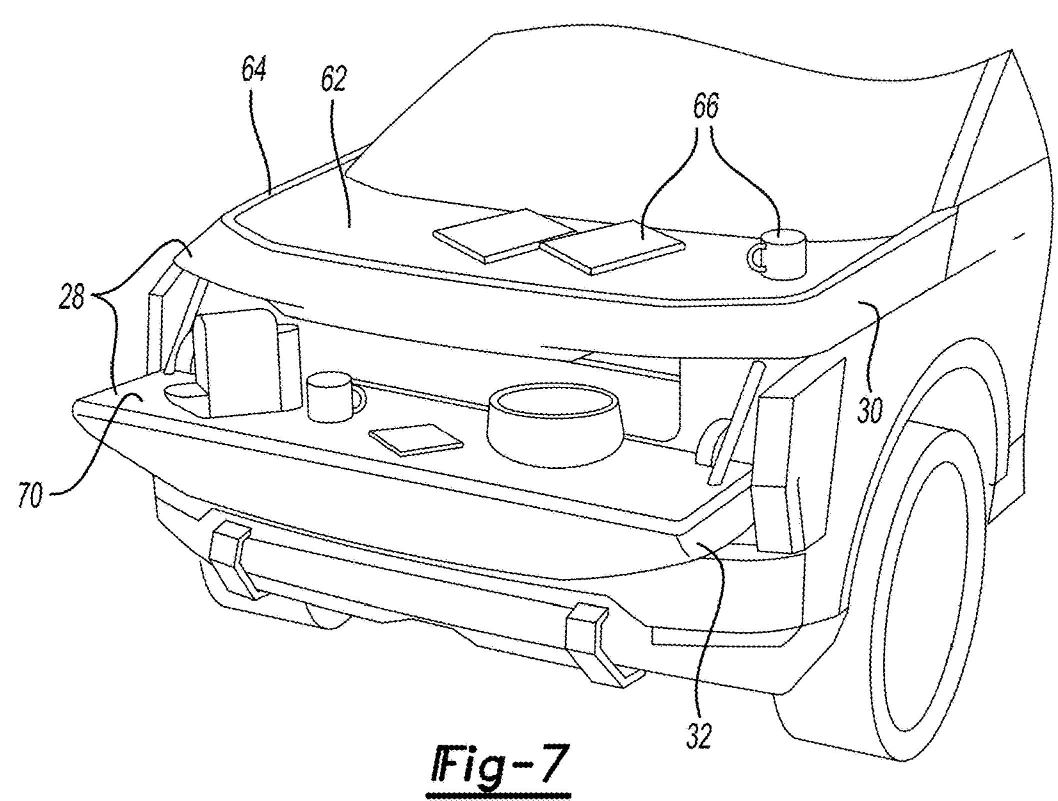
FIG. 7 Illustrates a front, perspective view of the electrified vehicle of FIGS. 1 and 2 showing an lower closure of a split gate frunk hood assembly in an open position to provide a table.

With reference to FIG. 7, the closure assembly 28 of the vehicle 10 is shown with the upper closure 30 in a closed position and the lower closure 32 in an open position. The lower closure 32 is movable to the open position while the upper closure 30 is in the closed position.

The upper closure 30 includes a upper closure work surface 62 that is substantially horizontally aligned when the upper closure 30 is in the closed position. The upper closure 30 includes a raised lip 64 that extends along perimeter of the upper closure work surface 62 on the driver side, the passenger side, and a front of the upper closure work surface 62. The raised lip 64 can help to delineate the upper closure work surface 62 from other areas of the upper closure 30 and can help to block items 66 positioned on the upper closure work surface 62 from falling.

The lower closure 32 includes a lower closure work surface 70 that is substantially horizontally aligned when the lower closure 32 is in an open position. Together, the lower closure 32 in a open position and the upper closure 30 in a closed position provide a multi-level work surfaces for users. The lower closure 32 provides a work surface approximately at a table height. The upper closure 30 provides a higher work surface at approximately a bar counter height.

The upper closure work surface 62, the lower closure work surface 70, or both can be swappable work surfaces. For purposes of this disclosure, swappable work surface are work surfaces that can be exchanged for other work surfaces by the user. The user could, for example, swap the lower closure work surface 70, which is a polymer-based work surface, for another work surface that is metal, or wooden, or magnetic. Magnets can be used to secure the swappable work surfaces, for example. In other examples, threaded fasteners or clips could be used. If the swappable work surface is a ferrous metal, cooking accessories could be anchored to the swappable work surface through magnetic feet.

Figure 8:
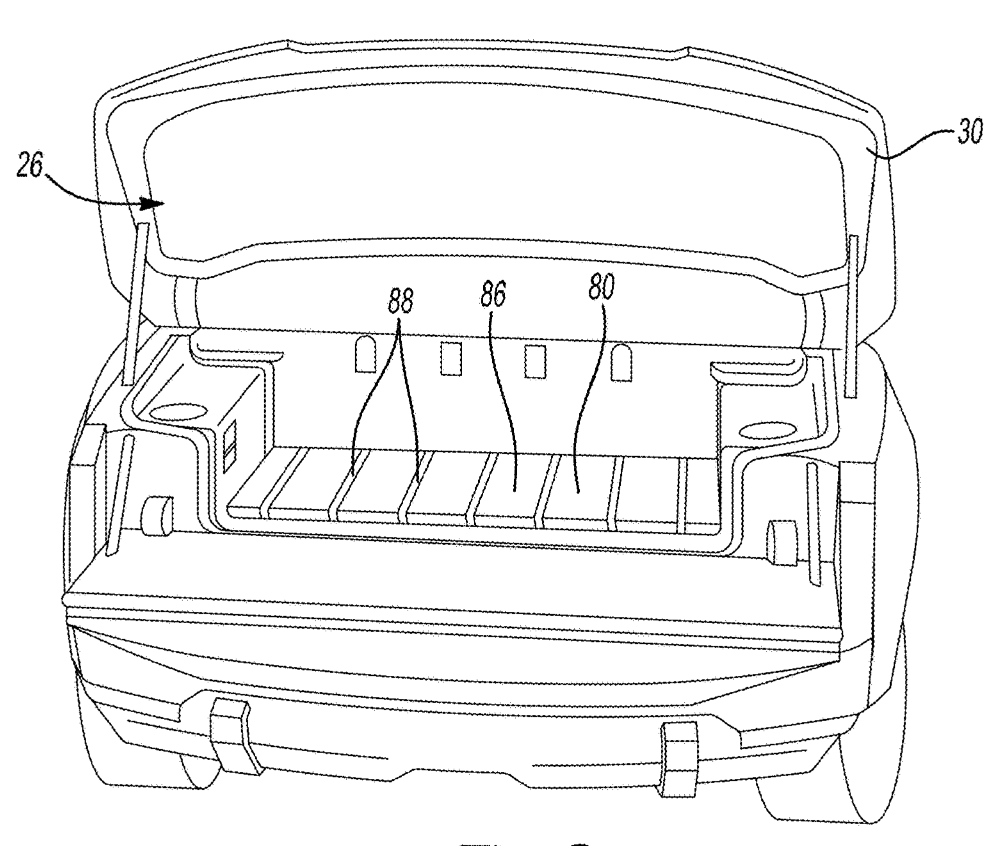
FIG. 8 illustrates a front view of the electrified vehicle of FIGS. 1 and 2 showing an upper closure and a lower closure of a split gate frunk hood assembly in open positions and showing a case having a lid in a closed position.
Figure 9:
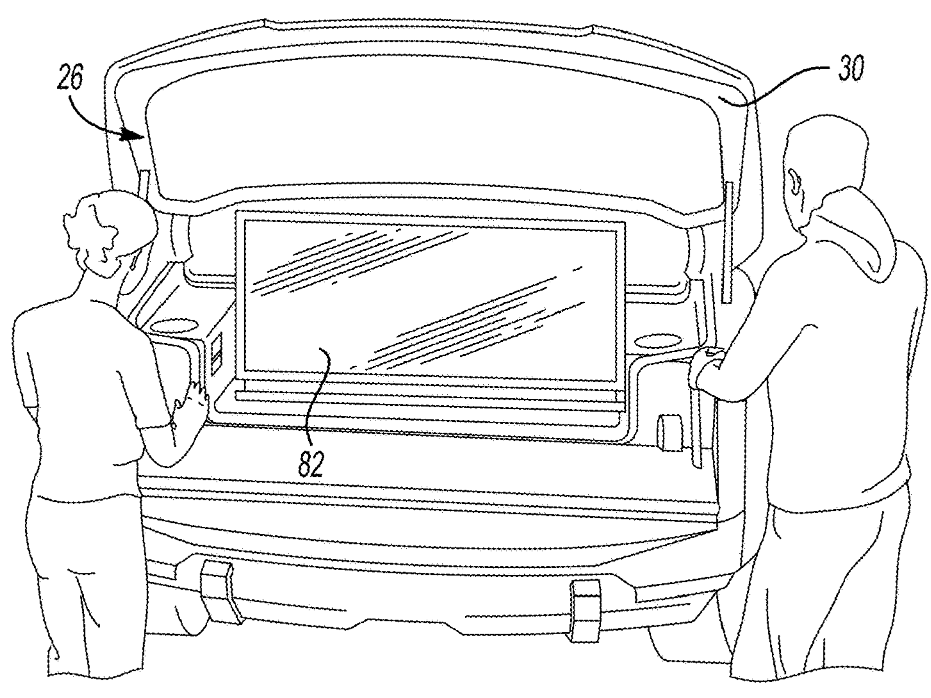
FIG. 9 illustrates the case of FIG. 8 in an open position to present a television in a viewing position.
Figure 10:
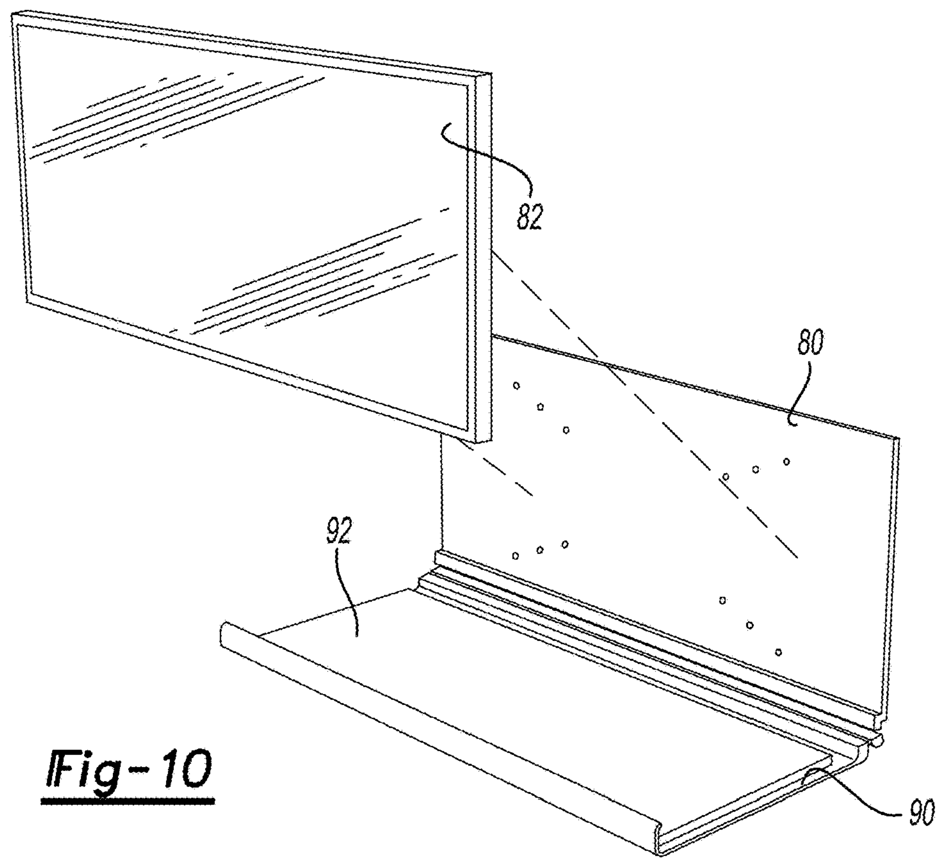
FIG. 10 illustrates a perspective, expanded view of the case and the television of FIGS. 8 and 9.

With reference to FIGS. 8-10, the frunk 26, in this example, can include case 80 that holds a television 82. The case 80 has a lid 86 with reinforcing members 88. The television 82 can attach directly to the lid 86. The case 80 can be equipped with standardized mounting hole patterns as shown in FIG. 9 to facilitate attaching the television 82 using bolts, for example. The case 80 further includes a base 90 lined with a cushion 92, such as a foam cushion.

The case 80 can be closed as shown in FIG. 7 when viewing the television 82 is not desired. When closed, the screen of the television 82 rest on the cushion 92.

When viewing the television 82 is desired, the lid 86 can be flipped up to the position of FIG. 8. The case 80 can include dampened barrel hinges to facilitate rotation of the lid 86 with and the television 82 to the viewing position of FIG. 8. Individuals can gather around the frunk 26 to view the television 82 when the lid 86 is flipped up to the viewing position. The upper closure 30 is open when the lid 86 is rotated to the viewing position and can help to shield the television 82 from the elements.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle cargo space access providing method, comprising:

in response to a request to access a cargo space of a vehicle that is in a first parked position, confirming that a movement of the vehicle from the first parked position to a second parked position is unobstructed; and while continuing the confirming, moving the vehicle automatically from the first parked position to the second parked position, the cargo space more accessible to a user when the vehicle is in the second parked position than when the vehicle is in the first parked position.

2. The vehicle cargo space access providing method of claim 1, wherein the request comprising receiving a signal initiated by the user.

3. The vehicle cargo space access providing method of claim 1, wherein the request comprises detecting that the user is approaching the vehicle using a sensor suite of the vehicle.

4. The vehicle cargo space access providing method of claim 1, wherein the request comprises detecting, using a sensor suite of the vehicle, that the user is approaching the vehicle while transporting an item.

5. The vehicle cargo space access providing method of claim 1, further comprising confirming that the movement is unobstructed using a sensor suite of the vehicle.

6. The vehicle cargo space access providing method of claim 1, wherein the moving comprises reversing the vehicle from the first parked position to the second parked position.

7. The vehicle cargo space access providing method of claim 1, wherein the cargo space of the vehicle is a frunk.

8. The vehicle cargo space access providing method of claim 7, wherein the frunk is closer to an obstacle when the vehicle is in a first parked position than when the vehicle is in a second parked position.

9. The vehicle cargo space access providing method of claim 1, wherein the vehicle is unoccupied during the confirming and the moving.

10. The vehicle cargo space access providing method of claim 1, wherein the vehicle is a truck.

11. The vehicle cargo space access providing method of claim 1, wherein the vehicle is an electrified vehicle.

12. The vehicle cargo space access providing method of claim 1, further comprising opening a closure assembly automatically to provide access to the cargo space.

13. The vehicle cargo space access providing method of claim 12, wherein the closure assembly is a split gate frunk hood assembly having an upper closure that pivots upward during the opening, and a lower closure that pivots downward during the opening.

14. The vehicle cargo space access providing method of claim 13, wherein the upper closure includes a upper work surface that is horizontally aligned when the upper closure is in a closed position, and the lower closure includes a lower work surface that is horizontally aligned when the lower closure is in an open position.

15. The vehicle cargo space access providing method of claim 14, wherein the lower closure is movable to the open position when the upper closure is in a closed position.

16. The vehicle cargo space access providing method of claim 14, wherein the upper work surface is configured as a swappable work surface, the lower work surface is configured as a swappable work surface, or both.

17. The vehicle cargo space access providing method of claim 12, wherein at least some of the opening occurs during the moving.

18. The vehicle cargo space access providing method of claim 1, further comprising, additionally confirming that a movement of the vehicle from the second parked position back to the first parked position is unobstructed, and, while continuing the confirming, moving the vehicle automatically from the second parked position to the first parked position.

19. The vehicle cargo space access providing method of claim 1, wherein the cargo space is a frunk containing a case configured to hold a television.

20. A vehicle cargo space access providing method, comprising: receiving, by a controller of a vehicle, a request to access a cargo space of the vehicle while the vehicle is in a first parked position; confirming, using a sensor suite of the vehicle, that a movement of the vehicle from the first parked position to a second parked position is unobstructed; and while continuing the confirming using the sensor suite, autonomously moving the vehicle from the first parked position to the second parked position, the cargo space being more accessible to a user when the vehicle is in the second parked position than when the vehicle is in the first parked position.

* * * * *